May 3, 1932.   F. PIERSON   1,856,591
MASSAGE MACHINE
Filed Aug. 13, 1930   5 Sheets-Sheet 1

INVENTOR
F. Pierson
BY H. J. Sanders
ATTORNEY

May 3, 1932.  F. PIERSON  1,856,591
MASSAGE MACHINE
Filed Aug. 13, 1930   5 Sheets-Sheet 2

INVENTOR:
F. Pierson
BY H. J. Sanders
ATTORNEY

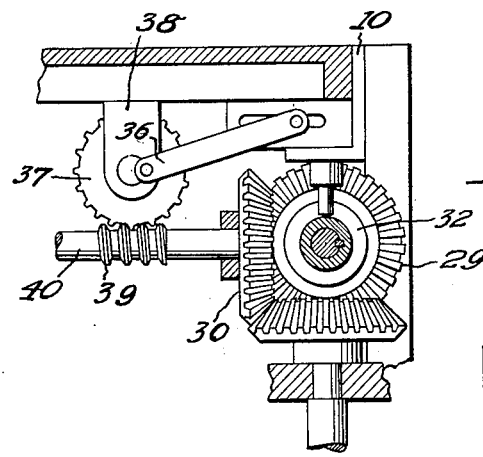
Fig. 4.
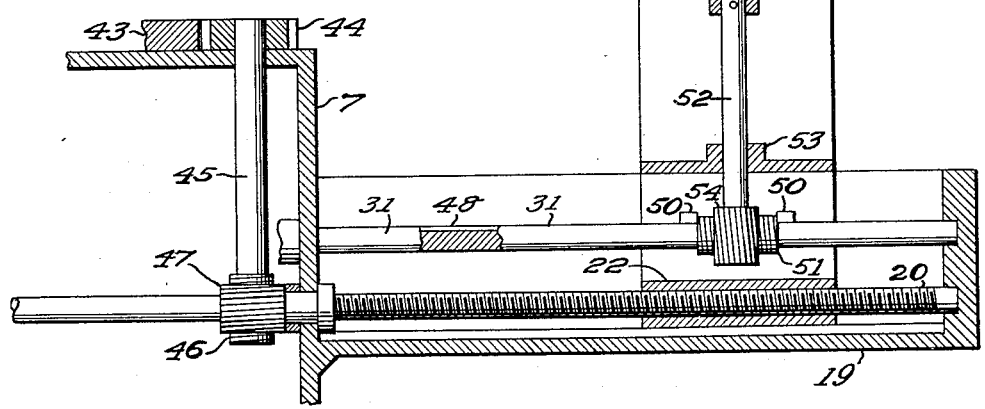
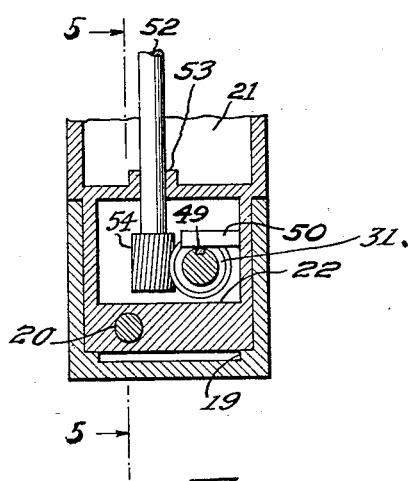
Fig. 5.
Fig. 6.

May 3, 1932.  F. PIERSON  1,856,591
MASSAGE MACHINE
Filed Aug. 13, 1930  5 Sheets-Sheet 4

INVENTOR:
F. Pierson
BY H. J. Sanders
ATTORNEY

May 3, 1932.  F. PIERSON  1,856,591
MASSAGE MACHINE
Filed Aug. 13, 1930    5 Sheets-Sheet 5

INVENTOR:
F. Pierson
BY H. J. Sanders
ATTORNEY

Patented May 3, 1932

1,856,591

UNITED STATES PATENT OFFICE

FRANK PIERSON, OF CHICAGO, ILLINOIS

MASSAGE MACHINE

Application filed August 13, 1930. Serial No. 474,939.

This invention relates to improvements in massage machines for administering body massage. One object is to provide a machine of this type that may be operated by the patient himself so that "home treatments" or treatments in beauty parlors without the watchful attention of a skilled masseur are made practical. Mechanical means are here provided for reducing overweight without ill effects and without the necessity of taking medicines of any kind or of rigorous dieting.

A further object is to provide a machine of this type that is instantly adjustable to suit the height and bulk or build of individuals of all sizes. A still further object is to provide a machine of this type that is efficient in use and yet its contact with the body is so gentle that no ill effects or unpleasantness are experienced through the first or succeeding treatments.

The machine is electrically operated, always fully under the control of the patient or attendant, instantly responsive in its movements to its controls and its impulses so cushioned that no material sensation of mechanical action asserts itself.

The invention consists in the combination and arrangement of parts to be hereinafter fully described, pointed out in the claims and illustrated in the accompanying drawings which form a part of this application for patent and in which—

Fig. 4 is an enlarged fragmentary sectional view of Fig. 3 illustrating the rack actuating and clutch throwing mechanism.

Fig. 5 is an enlarged fragmentary sectional view of Fig. 1 showing the roller frame adjusting screw shaft and the roller driving mechanism, and it is taken on the line 5—5 of Fig. 6.

Fig. 6 is a vertical sectional view through one end of Fig. 5.

Like reference characters denote corresponding parts throughout the several views.

Figure 1:
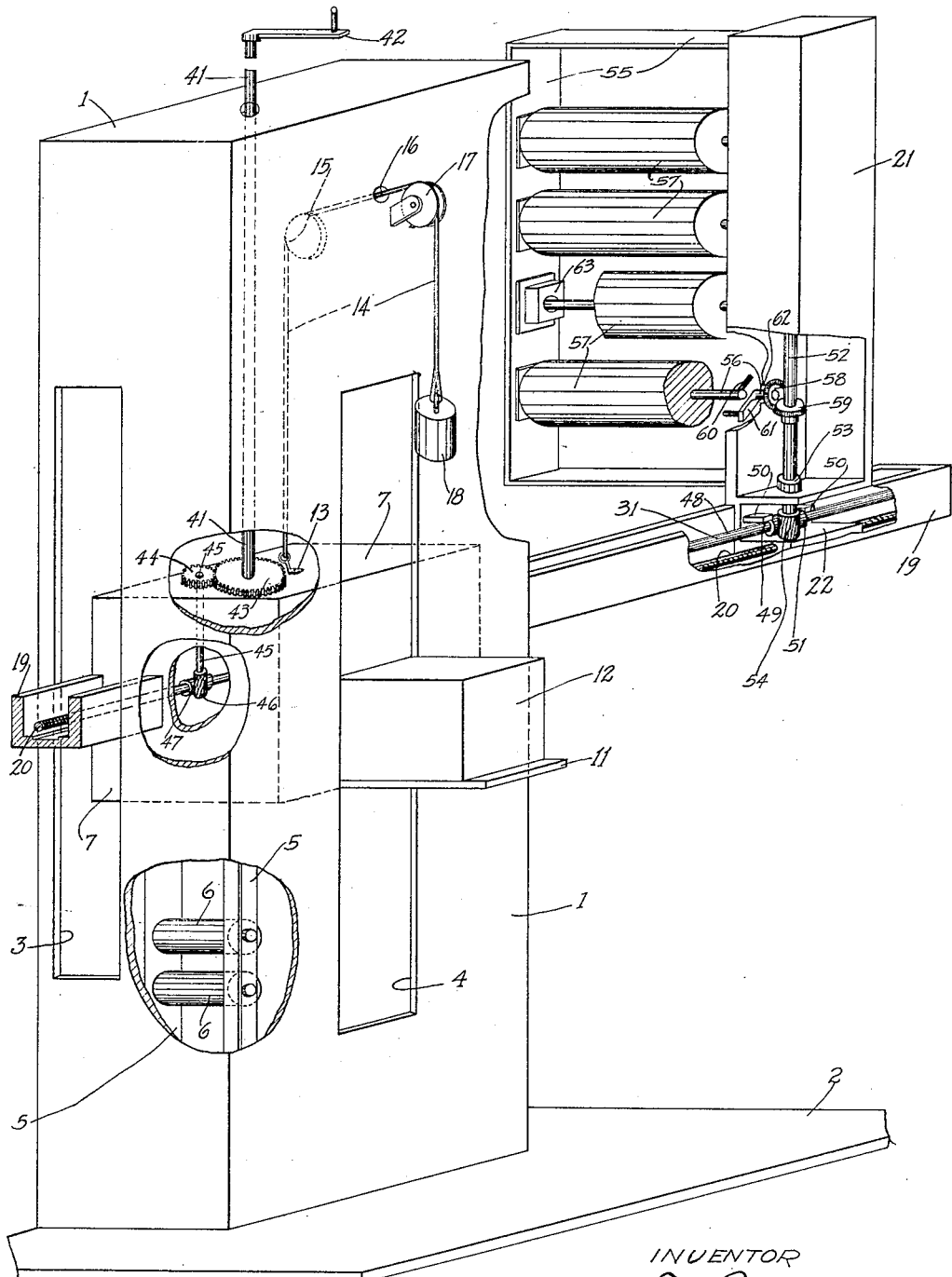
Fig. 1 is a perspective view of the machine with parts broken away to afford a better illustration.
Figure 2:
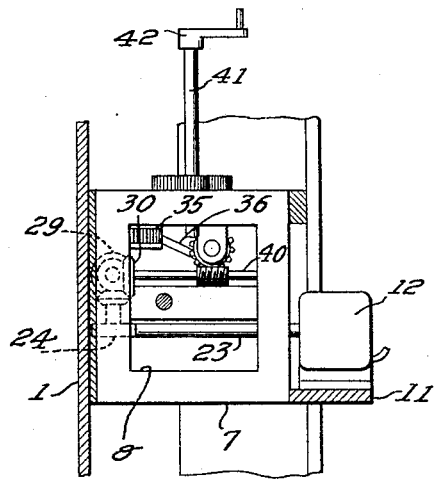
Fig. 2 is a fragmentary sectional view of the machine illustrating the travelling frame and connections.
Figure 3:
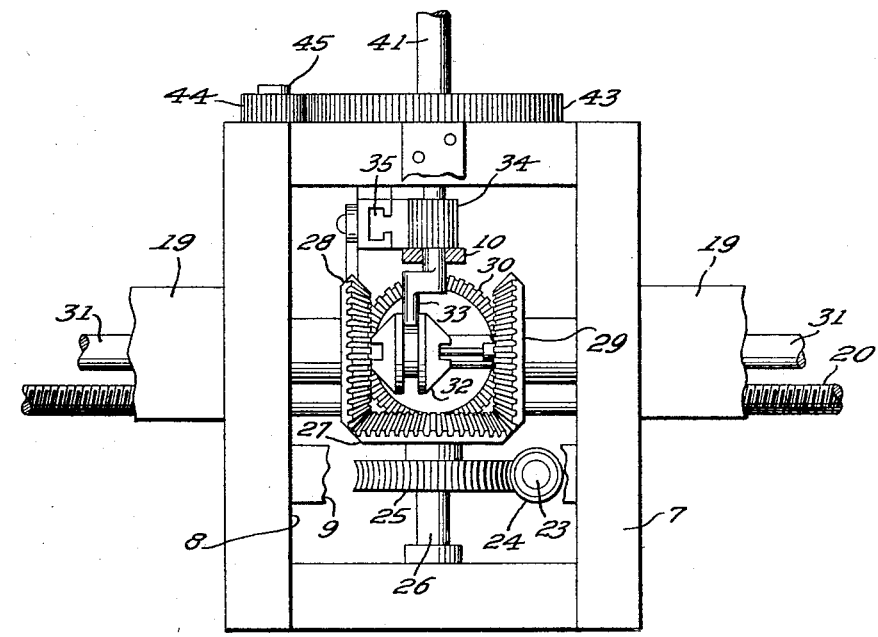
Fig. 3 is an enlarged view of the travelling frame with its associated mechanism shown more in detail.
Figure 7:
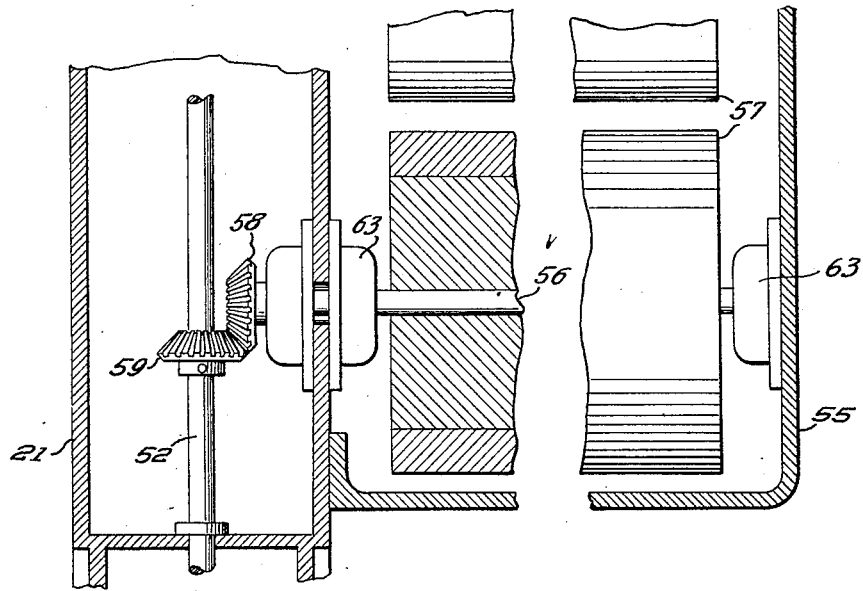
Fig. 7 is an enlarged fragmentary sectional view through the roller assembly showing the roller drive mechanism.
Figure 8:
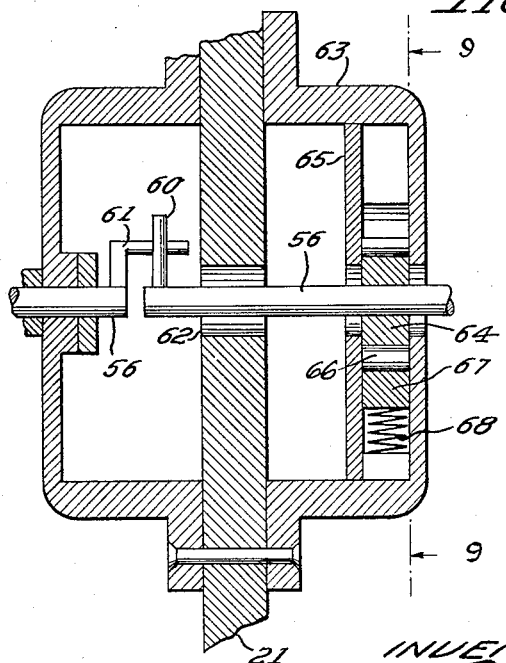
Fig. 8 is an enlarged sectional view through the roller vibrating mechanism.

The machine comprises an upright hollow housing 1 of oblong formation and supported upon a base 2, the sides of the machine being formed with the parallel diametrically opposed elongated rectangular slots 3 and the rear face of the machine with a perforation 4. Riveted to the side walls of the housing 1 therewithin are the angular sides 5 that extend longitudinally of said walls and form the framework of the rollers 6, two sets of rollers being provided, said sets being diametrically opposite each other upon the walls of the housing. Snugly received within said housing and between said rollers and slidable thereover is the casing 7, two opposed sides of which are formed with the large openings 8 as shown in Figs. 2 and 5, said open faces being spanned by the cross members 9.

The casing 7 is formed with a platform 11 extending outwardly from its base through the perforation 4 in the housing to receive and support the motor 12. A ring or handle 13 for the casing 7 is engaged by the cable 14 that passes over a sheave 15 in said housing, through a perforation 16 and over another sheave 17 outside the housing and carries a weight 18. The casing 7 travels up and down in the housing over the rollers 6 with little friction. Extending outwardly from two opposed sides of the casing 7 and out through the slots 3 in the side walls of the housing 1 is a trough-shaped platform 19 formed with closed ends, each platform extending materially beyond the side walls of said housing and a screw shaft 20 extending longitudinally of said platforms and through said casing 7 and having its ends operatively supported in the closed ends of said platforms, the portions of said screw shaft 20 in said platforms 19 being reversely threaded and each of said shaft portions having arranged thereupon a standard 21, each standard being formed with a tubular interiorly threaded sleeve 22 that receives said screw shaft and, as the same rotates, travels thereover. The standards 21 upon opposite sides of the housing 1 travel, therefore, in opposite directions as said screw shaft is rotated.

The shaft 23 of the motor is provided with a worm 24 in mesh with a worm gear 25 fast upon a transmission shaft 26 that has fast thereto a bevel gear 27 in mesh with the bevel gears 28, 29, 30, the bevel gears 28, 29 being loose upon the shaft 31 and adapted to mesh alternately with the clutch 32 keyed to and rotating with said shaft 31 so that when the clutch is in engagement with the bevel gear 28 the shaft 31 will be rotated in one direction and when the clutch is in mesh with the bevel gear 29 the shaft 31 will be rotated in the opposite direction.

Operatively engaged with the clutch 32 is the angular throw pin 33 one end of which is journaled in the casing, said pin being supported also by a bracket 10 and having fast upon it the gear wheel 34 in mesh with the rack 35 that is actuated by the crank 36 connected to the worm gear 37 supported in the bracket 38 secured to the casing, said worm gear being in mesh with the worm 39 of the shaft 40 to which the aforesaid bevel gear 30 is made fast. One complete revolution of the worm gear 37 will move the rack 35 back and forth or raise and lower it once and this action will cause the throw pin 33 to engage the clutch 32 with the gears 28 and 29 alternately.

A shaft 41 journaled in the casing 7 is rotated by means of the handle 42 and fast to said shaft 41 is the large gear 43 in mesh with the pinion 44 fast upon shaft 45 arranged in the casing 7, said shaft 45 being connected by the worm gears 46, 47 to the said screw shaft 20. Only the portions of the screw shaft 20 are threaded that are intended to receive the sleeves 22 for travel thereover. Obviously by manually rotating the handle 42 the screw shaft 20 may be rotated to cause the standards 21 to move along said platforms 19.

The shaft 31 in each platform is formed with a keyway 48 in which travel the key 49 of the worm gear 51 that is keyed to and rotates with said shaft, lugs 50 slidable over said shaft and arranged at opposite ends of said worm gear move the same along the shaft as the standard moves. A shaft 52 extends longitudinally and centrally of each standard 21 and is journaled in a bearing 53 thereof, said shaft being connected by worm gear 54 to the said worm gear 51 whereby the motion of the shaft 31 is transmitted to said shafts 52.

Figure 9:
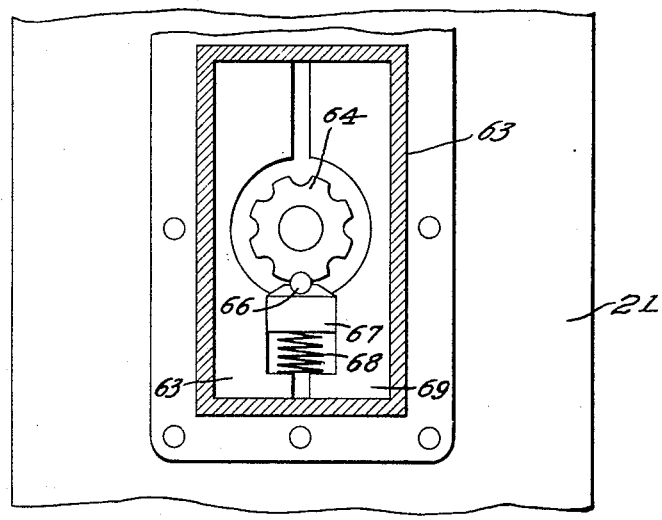
Fig. 9 is a vertical sectional view through Fig. 8 on the line 9, 9 thereof.
Figures 10, 11:
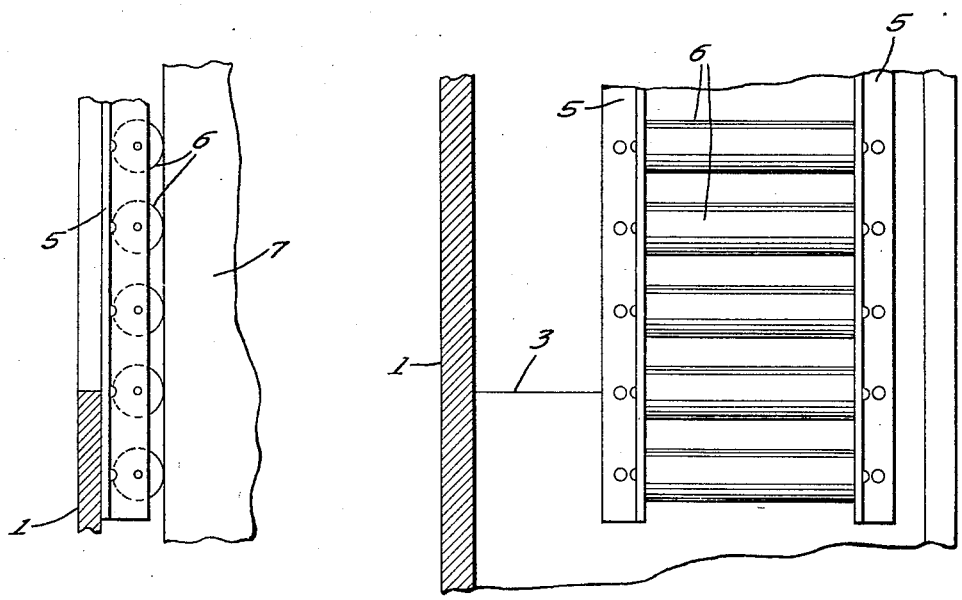
Fig. 10 is a front view of a reversible roller rack employed.
Fig. 11 is an edge view of Fig. 10.

A roller frame 55 extends outwardly at a 90 degree angle from each standard and is carried thereby, said frame 55 and the standards 21 having journaled therein the ends of the shafts 56 of the rollers 57 spaced slightly apart in said frame 55, each roller shaft 56 being connected by a bevel gear 58 to a similar gear 59 of the shaft 52 whereby the movement of said last named shaft is transmitted to the roller. Each roller shaft 56 is of sectional two-piece formation, the contiguous ends being connected by one straight pin 60 and an angular pin 61 carried by said shaft sections for engagement with each other, one section of the shaft 56 extending through a relatively large perforation 62 in one side wall of the standard 21, said contiguous shaft end sections being housed in a two piece casting 63, the roller receiving portion of the shaft extending through a peripherally notched wheel 64 which is fast thereupon, said notched wheel being disposed snugly between one wall of the casting 63 and a vertical partition 65 therein, said notched wheel riding over a small roller 66 carried by the block 67 that is disposed upon the expansion coil spring 68, said block and spring being held in position by the filler blocks 69 recessed to receive and house them in such manner that the block 67 is capable of vertical movement as the notched wheel rotates, this arrangement providing a vibration of the rollers as they move. This vibration is imparted to the body giving it a vibratory massage. The rollers are rubber covered as shown in Fig. 9.

In operation the patient stands between the sets of rollers mounted in the frames 55. By means of the handle 42 he adjusts these frames until the sets of rollers are brought gently against his body. Rotation of the handle 42 will cause rotation, through gear and pinion 43, 44 and shaft 45 and connects 46, 47 of the screw shaft 20 which will move the standards 21 that carry the frames 55.

When the proper adjustment is attained the motor will be started which through its shaft 23, worm 24, worm gear 25, bevel gears 27, 28, 29 will rotate the rollers. Bevel gear 30 will rotate shaft 40 with worm 39 in mesh with the worm gear 37 that will raise and lower the rack 35 through the medium of the crank 36. The bevel gears 28, 29 being alternately secured by the clutch to the shaft 31 will drive it alternately in opposite directions and shaft 31 being connected to shafts 52 will alternately drive them and the shaft rollers 56 with the rollers 57 in opposite directions. The gear train is such that the rollers 57 will move slowly and the mechanism is so counterbalanced through the medium of the weight 18 and connections that the rotation of the rollers 57 in one direction against the body of the patient will raise the frame 7 and its connections in the housing and rotation in the opposite direction will lower the frame 7 and connections. But very little friction is required to do this as the mechanism is so carefully balanced.

What is claimed is:—

1. In a massage machine, a housing, a frame adjustably supported therewithin, platforms carried by said frame and extending out through said housing, standards adjustably carried by said platforms, roller frames carried by said standards, rollers in said frames, a motor, and power transmission mechanism connecting said motor and rollers whereby they are driven alternately in opposite directions.

2. In a massage machine, a housing, a frame adjustably supported therewithin, platforms carried by said frame and extending out from said housing, standards adjustably carried by said platforms, roller frames carried by said standards, rollers in said frames, a motor, and power transmission mechanism connecting said motor and rollers whereby the latter are driven alternately in opposite directions, said frame and connections being so mounted in said housing that rotation of said rollers against an object will actuate said frame in said housing.

3. In a massage machine, a housing, a frame adjustably supported therewithin, platforms carried by said frame and extending outwardly from said housing, standards adjustably carried by said platforms, roller frames carried by said standards, a set of rollers in each frame, a motor, and power transmission mechanism connecting said motor and rollers whereby each set is rotated alternately in opposite directions, said frame and connections being so mounted in said housing that rotation of said sets of rollers as set forth and against an object interposed therebetween will alternately raise and lower said frame in said housing.

4. In a massage machine, a housing, a frame adjustably supported therewithin, platforms carried by said frame and extending outwardly through said housing, standards adjustably carried by said platforms, roller frames carried by said standards, a set of rollers in each frame, a motor, and power transmission mechanism connecting said motor and rollers whereby said sets are rotated simultaneously in opposite directions, said rotation being reversed automatically at predetermined intervals, said frame and connections being so mounted in said housing that rotation of said sets of rollers against an object interposed therebetween will alternately raise and lower said frame in said housing.

5. In a massage machine, a housing, a frame adjustably supported therewithin, platforms carried by said frame and extending outwardly from said housing, standards adjustably carried by said platforms, roller frames carried by said standards, rollers in said frames, a motor, power transmission mechanism connecting said motor and rollers for actuating the latter, and means connecting the shafts of said rollers for imparting thereto a vibratory motion as they rotate.

6. In a massage machine, a housing, a frame adjustably supported therewithin, platforms carried by said frame and extending outwardly from said housing, standards adjustably carried by said platforms, roller frames carried by said standards, rollers in said frames, sectional shafts for said rollers, pins connecting the sections of said shafts, a motor, power transmission mechanism connecting said motor and rollers, and means connecting the shafts of said rollers for imparting thereto a vibratory motion as they rotate.

7. In a massage machine, a housing, a frame adjustably supported therewithin, platforms carried by said frame and extending outwardly through said housing, standards adjustably carried by said platforms, roller frames carried by said standards, rollers in said frames, sectional shafts for said rollers, pins connecting the shaft sections, a motor, power transmission mechanism connecting said motor and rollers for rotating the latter alternately in opposite directions, said frame and connections being so mounted in said housing that rotation of said rollers against an object will actuate said frame in said housing, and means associated with said roller shafts for imparting thereto a vibratory motion as they rotate.

In testimony that I claim the foregoing as my own I have hereto affixed my signature.

FRANK PIERSON.